US008649369B2

(12) United States Patent
Lundberg et al.

(10) Patent No.: US 8,649,369 B2
(45) Date of Patent: Feb. 11, 2014

(54) METHODS AND SYSTEMS FOR COMPENSATING FOR DELAY IN VOICE OVER IP COMMUNICATIONS

(75) Inventors: Jonas Lundberg, Luleå (SE); Hans Hannu, Luleå (SE); Anders Nohigren, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1553 days.

(21) Appl. No.: 11/792,288

(22) PCT Filed: Dec. 2, 2005

(86) PCT No.: PCT/SE2005/001819
§ 371 (c)(1),
(2), (4) Date: Jun. 5, 2007

(87) PCT Pub. No.: WO2006/062461
PCT Pub. Date: Jun. 15, 2006

(65) Prior Publication Data
US 2007/0291744 A1 Dec. 20, 2007

(30) Foreign Application Priority Data
Dec. 8, 2004 (SE) ...................................... 0402988

(51) Int. Cl.
*H04L 12/66* (2006.01)
*G06F 3/00* (2006.01)
*H04J 3/06* (2006.01)

(52) U.S. Cl.
USPC .............................. 370/352; 710/52; 370/516

(58) Field of Classification Search
USPC ............... 710/52–57; 370/516, 517, 352–356
See application file for complete search history.

(56) References Cited

U.S. PATENT DOCUMENTS

| 2001/0018342 | A1* | 8/2001 | Vialen et al. ................... 455/423 |
| 2003/0152093 | A1 | 8/2003 | Gupta et al. |
| 2004/0120309 | A1* | 6/2004 | Kurittu et al. ................. 370/352 |
| 2004/0156624 | A1 | 8/2004 | Kent et al. |

(Continued)

FOREIGN PATENT DOCUMENTS

JP 2004-304325 10/2004

OTHER PUBLICATIONS

Summary of Japanese official action, Oct. 16, 2009, in corresponding Japanese Application No. 2007-545413.
International Search Report mailed Feb. 28, 2006.

(Continued)

*Primary Examiner* — Asad Nawaz
*Assistant Examiner* — Joel Hamel
(74) *Attorney, Agent, or Firm* — Nixon & Vanderhye PC

(57) ABSTRACT

The present invention relates to a method and a user equipment arranged to communicate with at least a second user equipment in a VoIP service data transmission in a wireless communication system using a VoIP service, provided by an application server. The method comprises the steps of: receiving transmissions in form of a media stream from the at least one second user equipment; storing the data of the media stream; detecting whether an interruption of said transmissions having at least a minimum length has occurred during the VoIP service data transmission or expecting that an interruption of said transmissions having at least a minimum length will occur during the VoIP service data transmission, and if such an interruption is detected or expected, using a non-normative playout rate of the data at playout, thereby obtaining a more efficient interactivity in the user communication.

35 Claims, 9 Drawing Sheets

(56) References Cited

U.S. PATENT DOCUMENTS

2005/0070273 A1* 3/2005 Farnsworth et al. ........ 455/432.1
2005/0141541 A1* 6/2005 Cuny et al. .................... 370/437
2005/0157863 A1* 7/2005 Sizemore, Jr. ........... 379/211.01
2005/0243846 A1* 11/2005 Mallila ........................ 370/412

OTHER PUBLICATIONS

International Preliminary Report on Patentability (PCT/IPEA/416).
Demand (PCT/IPEA/401).
"Technical Specification Group Radio Access Network; Radio Resource Control (RRC), Protocol Specification," TS 25.331 V4.13.0, Mar. 2004.

* cited by examiner

METHODS AND SYSTEMS FOR COMPENSATING FOR DELAY IN VOICE OVER IP COMMUNICATIONS

This application is the U.S. national phase of International Application No. PCT/SE2005/001819 filed 2 Dec. 2005 which designated the U.S. and claims priority to SE 0402988-0 filed 8 Dec. 2004, the entire contents of each of which are hereby incorporated by reference.

TECHNICAL FIELD

The present invention relates in general to the field of communications, and, in particular, to communication systems where a user of a first user equipment is able to communicate with at least a second user equipment by using a VoIP service, such as a Push-to-talk Over Cellular (PoC) service or a PoC VGM (Video Group Message), provided by an application server, e.g. a SIP application server (Session Initiation Protocol application server).

BACKGROUND OF THE INVENTION

Public Land Mobile radio Network (PLMN) is a generic term for a mobile wireless network that is centrally operated and administrated by an organization and uses land-based radio frequency transmitters or base stations as network hubs. PLMNs can stand alone and interconnect with one another or connect to a fixed system such as the PSTN.

In the near future there will be an increase in traffic load on the packet switched part of the PLMNs, such as GSM/(EDGE) GPRS, UMTS (WCDMA) and CDMA2000 due to the development and implementation of new packet based services. One such packed based service that utilizes packet switched bearers is referred to as Push to talk over Cellular (PoC). Push to talk over Cellular (PoC) is currently being standardized and agreed upon in an industry consortium known as the Open Mobile Alliance (OMA) forum.

Push-to-talk over Cellular (PoC) is being developed for handsets in networks such as GSM/(EDGE) GPRS networks, UMTS (WCDMA), and CDMA systems. PoC is basically a voice chat for cellular telecommunication systems. PoC provides quick one-to-one or group communication, providing something like a short instant VoIP service, which feels like "walkie talkies".

PoC enabled handsets will most likely be equipped with a PoC-button. The PoC button may (for example) be: a dedicated hardware button; an assigned button on a standard keypad; or, a software button used in e.g. pressure sensitive screens. When the PoC button is pressed, the handset is connected to another user or user group via a PoC server. The first releases of PoC provide half-duplex service, although full duplex may be available at a later stage.

Combinational services enrich the Circuit-Switched (CS) voice service of today, with images, music and video-clips. The images and/or video-clips would utilize the packet switched (PS) part of the PLMNs when being transferred from one user's client to another user's client.

Much effort and investment has been made to develop a fully packet switched solution for voice communication. Such solution is often referred to as Voice over IP (VoIP) since it is assumed that the Internet Protocol (IP) will be used to carry the media. Now this work will be reused to further enhance VoIP. It is anticipated that in the near future it will be possible to offer combinations of, for example, PoC with video (PoC Video Group Message) and/or images, and (telephony like) VoIP with video and/or images, even over current deployed PLMNs. Services that combine voice and image/video (regardless if the voice is packet switched or circuit switched) by the PoC button sometimes go under the name Push to Show (PtS) services.

One problem associated with such services is how to accurately set the media (e.g. audio, video, image) playback/rendering point to optimize the end-to-end (E2E) content delivery performance. This problem may arise in various situations. For example, the delay of the path of transfer may drastically change due to changes of transport-related settings or states in the nodes involved in the transport.

A channel type switch such as that which occurs in certain radio access bearer (RAB) realizations for wideband code division multiple access (WCDMA) is one illustration of this example problem situation for a packet switched audio service, such as VoIP or PoC. WCDMA is described, e.g., in 3GPP, "Technical Specification Group Radio Access Network; Radio Resource Control (RRC), Protocol Specification", TS 25.331 V4.13.0, March 2004.

Consider FIG. 8, which depicts the Radio Resource Control (RRC) state machine of WCDMA. The RRC state starts up in idle mode. When data is to be transmitted, the RRC state may go to CELL_DCH (camping on a dedicated channel) or to CELL_FACH (camping on a common channel). When the RRC state is in CELL_DCH and the transmitter throughput drops below a certain limit during a certain time period, a channel type down switch to CELL_FACH is executed. After yet some time without any new data the RRC state will switch down further to idle mode. However, if data is received prior to the down switch to idle mode, then depending on the amount of data (e.g., the Radio Link Control (RLC) buffer reaches a certain threshold), the RAB is switched to RRC state CELL_DCH. The problem for the audio is that some media will be transferred during the CELL_FACH state, and when the state switch occurs there will be a delay in the transmission of the media with the result of an annoying gap in the playout of audio to the recipient. Accordingly, during this switching operation, which generally requires about 0.5-1.0 sec, the data traffic is interrupted. For two users connected to each other via a PoC server, switching may occur either in the uplink or in the downlink or both. Consequently, an interruption of the data traffic lasting about 0.5-2.0 sec often occur, which, in turn, entails an interruption of the playout of the talk burst (a talk burst in PoC is one or several sentences spoken from the activating of the PoC button to releasing it), which the receiving part perceives or experiences as very annoying.

Furthermore, interruptions may also be caused by handover. In this case, the interruption(-s) will occur when the playout already has begun thereby entailing an interruption of the playout of the talk burst (a talk burst in PoC is one or several sentences spoken from the activating of PoC button to releasing it), which the receiving part perceives or experiences as very annoying.

There are a number of solutions addressing this problem. A first obvious solution is to increase the buffering time to a few seconds to avoid interruptions in the playout. This solution is however impaired by the drawback that the playout at the receiver(-s) will be delayed thereby increasing the response time, which, in turn, has a negative effect on the interaction among the participants in a VoIP service data transmission, such as a PoC data transmission. A second solution would be to use an selective buffer management in the client. The client increases the buffering time when channel switching is anticipated and otherwise a smaller buffer is used. When channel switching is anticipated this solution uses a longer buffering time, and, accordingly, the same problems as in the first solution will arise. Furthermore, an erroneous prediction whether channel switching will occur or not might lead to buffer underrun at the receiver.

Thus, there is a need for an improved VoIP service for communications systems with regard to perceived interactivity in user communications and, in particular, for a method for handling or compensating for interruptions or delays in the data traffic during VoIP service data transmissions, for example, PoC service data transmissions caused by channel switching.

BRIEF DESCRIPTION OF THE INVENTION

An object of the present invention is to provide an improved VoIP service for wireless communications systems, for example, GPRS networks or WCDMA networks in order to obtain a more efficient interactivity in the user communication.

Another object of the invention is to provide a method for handling or compensating for interruptions or delays in the data traffic during VoIP service data transmissions caused by channel switching using a VoIP service in wireless communications systems, for example, GPRS networks or WCDMA networks.

These and other objects are achieved according to the present invention by a method and a user equipment having the features defined in the independent claims. Preferred embodiments are defined in the dependent claims.

In the context of the present invention, the term "VoIP services" relates to services that provide audio using the IP protocol for transport the media. Example services are Push to talk over Cellular (PoC), which provides quick one-to-one or group communication, which feels like "walkie talkies", but also to combinations of, for example, PoC with video (PoC Video Group Message) and/or images, and VoIP with video and/or images and services related to music. Services that combine voice and image/video (regardless if the voice is packet switched or circuit switched) sometimes go under the name Push to Show services. Moreover, the term "application server" relates to a server handling such services.

For the purposes of clarity, the term "talk burst" relates to one or several sentences spoken from the activating of VoIP service to de-activating it. For example, in case of a PoC service it relates to sentences spoken from activating the PoC button on the user equipment to releasing it.

According to a first aspect of the invention, there is provided a method for operating a user equipment arranged to communicate with at least a second user equipment in a VoIP service data transmission in a communication system using a VoIP service. The method is characterized by the steps of: receiving transmissions in form of a media stream from the at least one second user equipment; buffering the data of the media stream; detecting whether an interruption of said transmissions having at least a minimum length has occurred during the VoIP service data transmission or expecting that an interruption of said transmissions having at least a minimum length will occur during the VoIP service data transmission; and, if such an interruption is detected or expected, using a normative playout rate of the data at playout, thereby obtaining a more efficient interactivity in the user communication.

According to a second aspect of the invention, there is provided a user equipment arranged to communicate with at least a second user equipment in a VoIP service data transmission in a communication system using a VoIP service. The user equipment comprises a buffer arranged to receive transmissions in form of a media stream from the at least one second user equipment and to store the data of the media stream; detecting means arranged to detect whether an interruption of the transmissions having at least a predetermined length has occurred during the VoIP service data transmission; and control means arranged to, if such an interruption is detected or expected, using a non-normative playout rate of the data at playout, thereby obtaining a more efficient interactivity in the user communication.

According to a further aspect of the invention there is provided a computer readable medium comprising instructions for bringing a programmable device to perform the method according to the first aspect of the invention.

The present invention is based on the idea of using a non-normative playout rate in order to adapt or modify the playout to the conditions of the communication channel and the current client buffer fullness.

This solution provides several advantages over the existing solutions. One major advantage is that some of the delays of the transmissions introduced due to, for example, channel switching as described above can be eliminated or significantly reduced. Thus, the user interaction will become quicker. The time it takes from the moment the sender exits the sending mode of the VoIP service, e.g. releases the VoIP service button (e.g. the PoC button), until the response arrives from the receiver is delayed, for example, in a PoC data transmission between 1-4 seconds since up to four channel switches are involved. By playing the media faster at the receiver his or hers response can be sent back earlier. For example, by playing the content approximately 20% faster it would be possible to catch up 1.5 seconds within an average talk burst, which is assumed to have a duration of about seven seconds. Accordingly, the response will then arrive 1.5 seconds earlier in comparison with the conventional technique. In group communications where some of the participants use modified playout while other use conventional buffering, the one with non-normative playout, which according to a preferred embodiment is faster than the normative playout rate, is able to reply faster and, thus, get hold of the floor before the other participants. Furthermore, interruptions caused by handover can be eliminated or significantly reduced. In this case, the interruption will occur when the playout already has begun and the playout is modified, i.e. the media is played faster, after the interruption when the transmission is resumed.

Another advantage is that the present invention easily can be implemented into the existing components and software of a user equipment without any major modifications. Moreover, no changes in the system or support from other clients are required since it only needs to be implemented in the VoIP service client.

As realized by the person skilled in the art, the method of the present invention, as well as preferred embodiments thereof, are suitable to realize or implement as a computer program or a computer readable medium, preferably within the contents of a mobile phone.

BRIEF DESCRIPTION OF THE DRAWINGS

Above-mentioned and other features and advantages of the present invention will be apparent from the following detailed description of preferred embodiments, merely exemplifying, in conjunction with the attached drawing, wherein.

DESCRIPTION OF PREFERRED EMBODIMENTS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well-known devices, circuits, and methods are omitted so as not to obscure the description of the present invention with unnecessary details. Moreover, individual function blocks are shown in some of the figures. Those skilled in the art will appreciate that the functions may be implemented using individual hardware circuits, using software functioning in conjunction with a suitably programmed digital microprocessor or general purpose computer, using an application specific integrated circuit (ASIC), and/or using one or more digital signal processors (DSPs).

Figure 1:
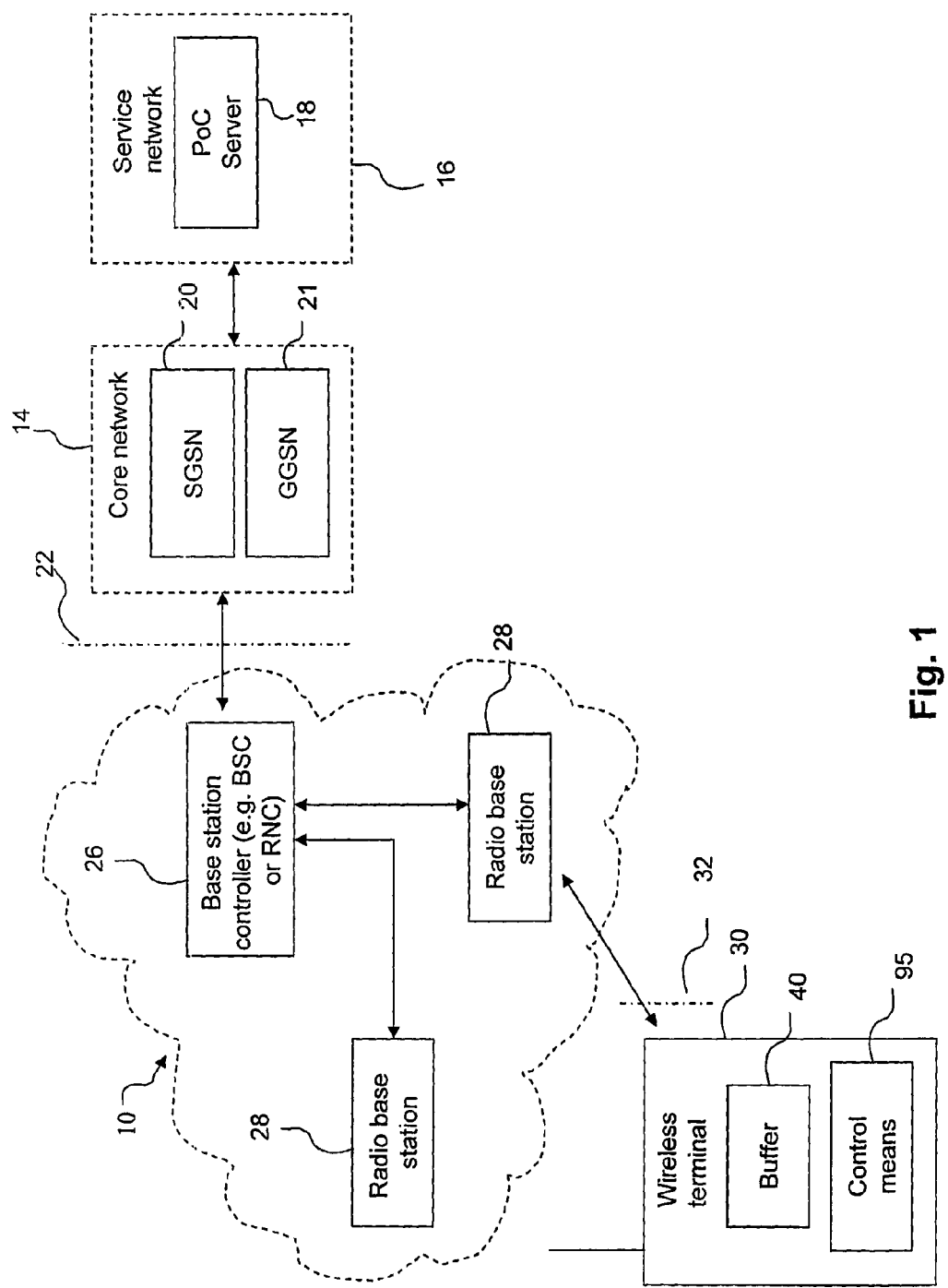
FIG. 1 is a schematic view of a generic telecommunication system in which the present invention can be employed.

FIG. 1 illustrates a generic telecommunications system as an example context in which the present invention may be employed. The first example system includes both a radio access network 10 and a core network 14. The core network 14 is shown as being connected to a service node or service network 16. The service network 16 (or other comparable entity) includes an application server 18, such as a, for example, SIP-based PoC Server which facilitates the Push to talk over Cellular (PoC) service previously described.

In one specific example implementation the core network 14 is a connectionless external core network and comprises Serving GPRS Support Node (SGSN) 20 and Gateway GRPS support node (GGSN) 21. The General Packet Radio Service (GPRS) Service (SGSN) node 20 is tailored to provide packet-switched type services. The Gateway GRPS support node (GGSN) 21 provides the interface towards the packet-switched networks (e.g., the Internet, X.25 external networks). The Gateway GRPS support node (GGSN) 21 translates data formats, signaling protocols and address information in order to permit communication between the different networks. Serving GPRS Support Node (SGSN) 20 provides packet routing to and from a SGSN service area, and serves GPRS subscribers which are physically located within the SGSN service area. Serving GPRS Support Node (SGSN) 20 provides functions such as authentication, ciphering, mobility management, charging data, and logical link management toward the user equipment unit. A GPRS subscriber may be served by any SGSN in the network depending on location. The functionality of Serving GPRS Support Node (SGSN) 20 and Gateway GRPS support node (GGSN) 21 may be combined in the same node, or may exist in separate nodes as shown in FIG. 1.

The core network 14 connects to radio access network 10 over a radio access network interface depicted by dot-dashed line 22. The radio access network 10 includes one or more control nodes 26 and one or more radio base stations (BS) 28. In an example, non-limiting implementation in which radio access network 10 is a UMTS Terrestrial Radio Access Network (UTRAN), the radio access network interface depicted by dot-dashed line 22 is known as the Iu interface, and the control nodes 26 take the form of radio network controllers (RNCs). In other implementations of radio access network 10, the control nodes 26 can have other names, such as base station controller (BSC), for example. In any event, it should be understood that, for sake of simplicity, the radio access network 10 of FIG. 1 is shown with only one control node 26, with the control node 26 being connected to two base stations (BS) 28. As understood by those skilled in the art, the radio access network 10 typically has numerous control nodes 26, which can be connected over an unillustrated interface (such as an Iur interface). Again for sake of simplicity, only two base station nodes 28 are shown connected to the representative control node 26. It will be appreciated that a different number of base stations 28 can be served by each control node 26, and that control nodes 26 need not serve the same number of base stations. Further, those skilled in the art will also appreciate that a base station is sometimes also referred to in the art as a radio base station, a node B, or B-node.

For brevity it is assumed in the ensuing discussion that each base station 28 serves one cell. It will be appreciated by those skilled in the art, however, that a base station may serve for communicating across the air interface for more than one cell. For example, two cells may utilize resources situated at the same base station site. Moreover, each cell may be divided into one or more sectors, with each sector having one or more cell/carriers.

A wireless terminal 30 communicates with one or more cells or one or more base stations (BS) 28 over a radio or air interface 32. In differing implementations, the wireless terminal 30 can be known by different names, such as mobile station or MS, mobile terminal or MT, or user equipment unit (UE), for example. Of course, whereas for ease of illustration only one wireless terminal 30 is shown in FIG. 1, each base station typically serves many wireless terminals.

In the example UMTS implementation mentioned above, radio access is preferably based upon Wideband, Code Division Multiple Access (WCDMA) with individual radio channels allocated using CDMA spreading codes. Of course, other access methods may be employed.

Of particular interest herein is the fact that, for or in conjunction with VoIP services such as Push to talk over Cellular (PoC), the wireless terminal 30 comprises a control means 95 controlling, for example, a buffer 40 via a buffer manager (see FIG. 4) as well as a speech decoder (see FIG. 4), as will be described hereinafter.

Figure 2:
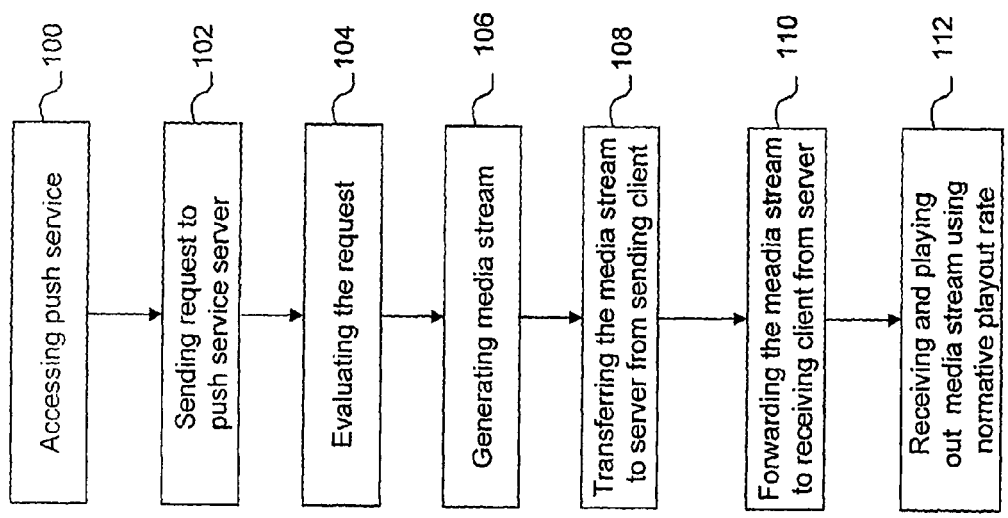
FIG. 2 is a schematic diagram showing the steps performed during a PoC service data transmission according to conventional technique.

With reference now to FIG. 2, the steps involved in communication between users of user equipments using a VoIP service, such as a PoC service or a PoC VGM (Video Group Message) service according to the conventional technology will be described. In this example, for the sake of simplicity, only two users are discussed but the skilled man in the art realizes that the services can be used for communication between one user and an arbitrary number of users. User A wishes to send a message to user B. First, at step 100, user A accesses the desired VoIP service, for example, by pressing a VoIP service button on his user equipment or VoIP service client, for example, a mobile phone. Then, at step 102, the VoIP service client sends a request to the application server 18, see FIG. 1, asking for permission to generate data to be sent; permission to speak if using a PoC service. Subsequently, at step 104, the application server decides if it should grant or reject the request and sends either an accept signal or a reject signal back to client A. Upon receiving the accept signal, at step 106, client A is arranged to indicate for User A that he or she is allowed to generate the signals to be sent, for example, to speak if a PoC service is used. The indication may, for example, be a visual or audible signal. The speech signal, if a PoC service is used, is encoded and ordered in packets before transmission. Thereafter, at step 108, the packets, from client A, are transmitted over the air interface, to the base station and further on to the application service server. The application service server forwards, at step 110, the packets to client B over another air interface. Then, at step 112, client B starts, upon receiving the packets, the decoder processing of the received speech frames of the received packets and the decoded speech frames are played out to User B by the loudspeaker in client B. However, it should be noted, as the skilled man realizes, that the media alternatively can be sent directly from mobile A to mobile B without passing the application server.

Figure 3A:
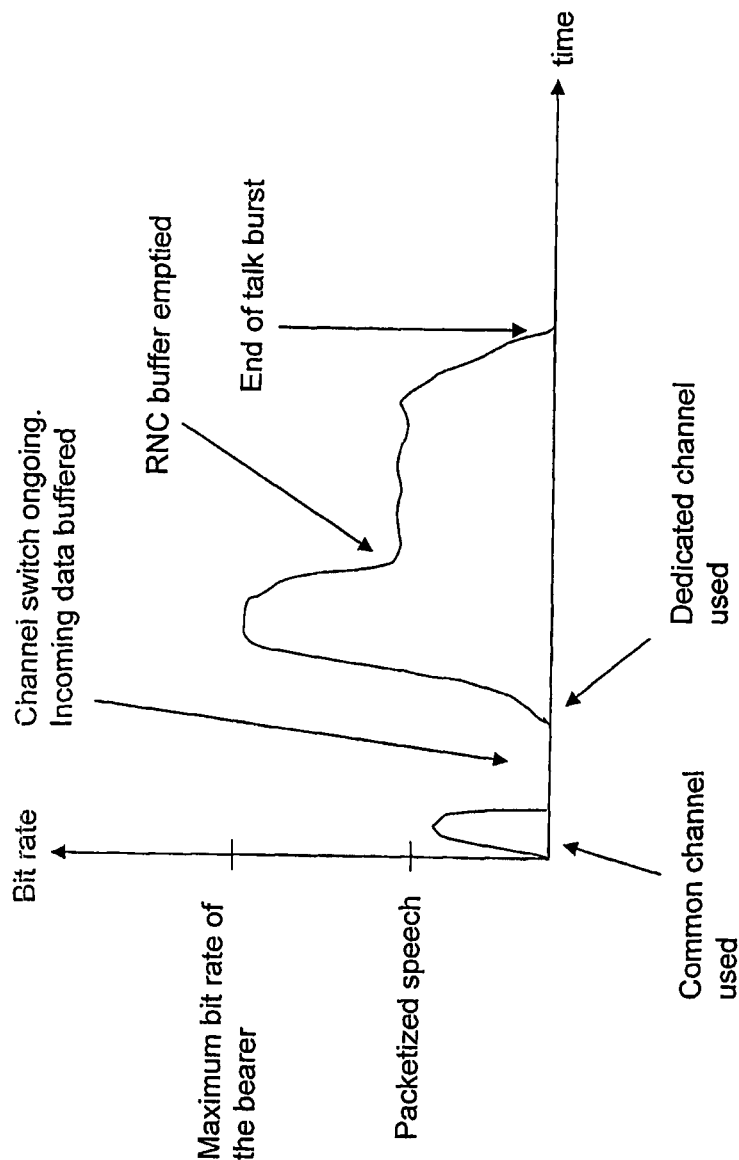
FIG. 3a is a schematic diagram showing the transmission bit rate during a VoIP service data transmission before, during and after a channel switch when using conventional technique.

As discussed above, interruptions of the data traffic due to channel switching, either in the uplink or the downlink or both, each generally requiring about 0.5-1.0 sec, are of a frequent occurrence. Consequently, an interruption of the data traffic lasting about 0.5-2.0 sec often occur, which, in turn, entails an interruption of the playout of the talk burst (a talk burst in PoC is one or several sentences spoken from the activating of PoC button to releasing it), which the receiving part perceives or experiences as very annoying. This is illustrated in FIG. 3a, where the transmission bit rate is indicated on the y-axis and time on the x-axis. As can be seen, a few packets are transferred using the common channel before the channel switching takes place and during the channel switching there is a gap.

Figure 3B:
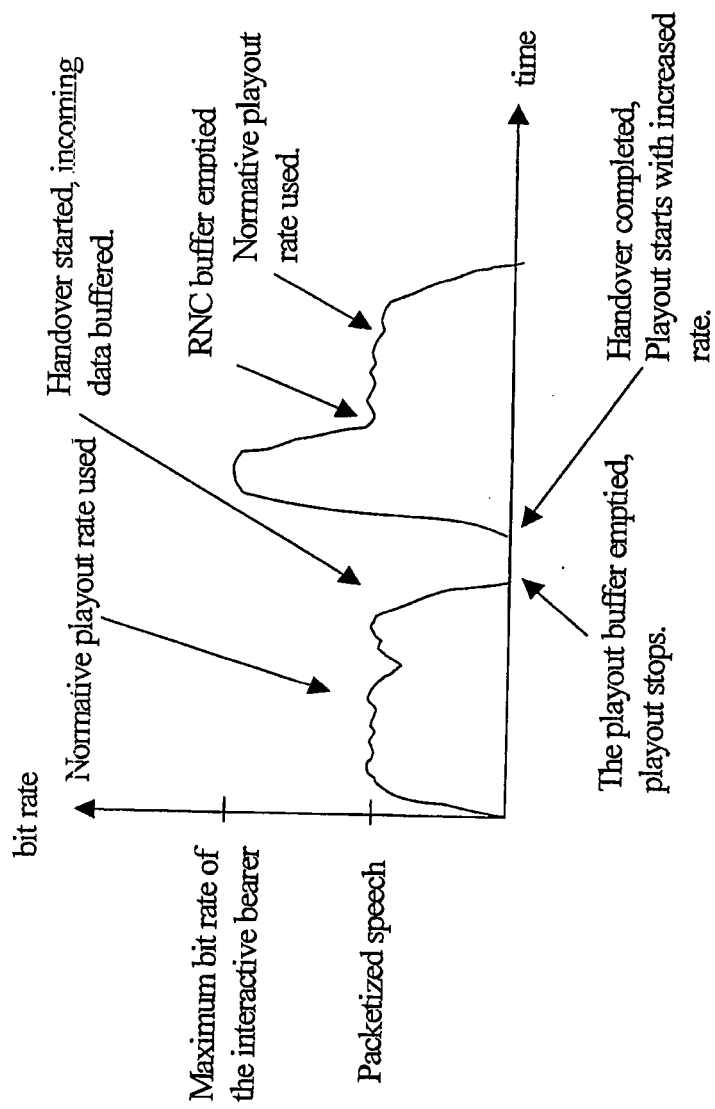
FIG. 3b is a schematic diagram showing the transmission bit rate during a VoIP service data transmission before, during and after a hand over when using conventional technique.

As discussed above, interruptions of the data traffic due to handover often occur. These interruptions are characterized by the fact that the interruption occur when the playout already has began. In other words, the transmission of packets and the playout of the talk burst (a talk burst in PoC is one or several sentences spoken from the activating of PoC button to releasing it) are in progress, as can be seen in FIG. 3b. Then, when the handover occur, the transmission is interrupted, which leads to that the playout buffer is emptied after a certain time of playout. This, in turn, leads to an interruption of the playout, which the receiving part perceives or experiences as very annoying. When the handover is completed after a certain period of time, the transmission of packets is resumed and playout is started again. According to the invention, the playout is started with an increased playout rate after the interruption, as illustrated in FIG. 3b.

Figure 4:
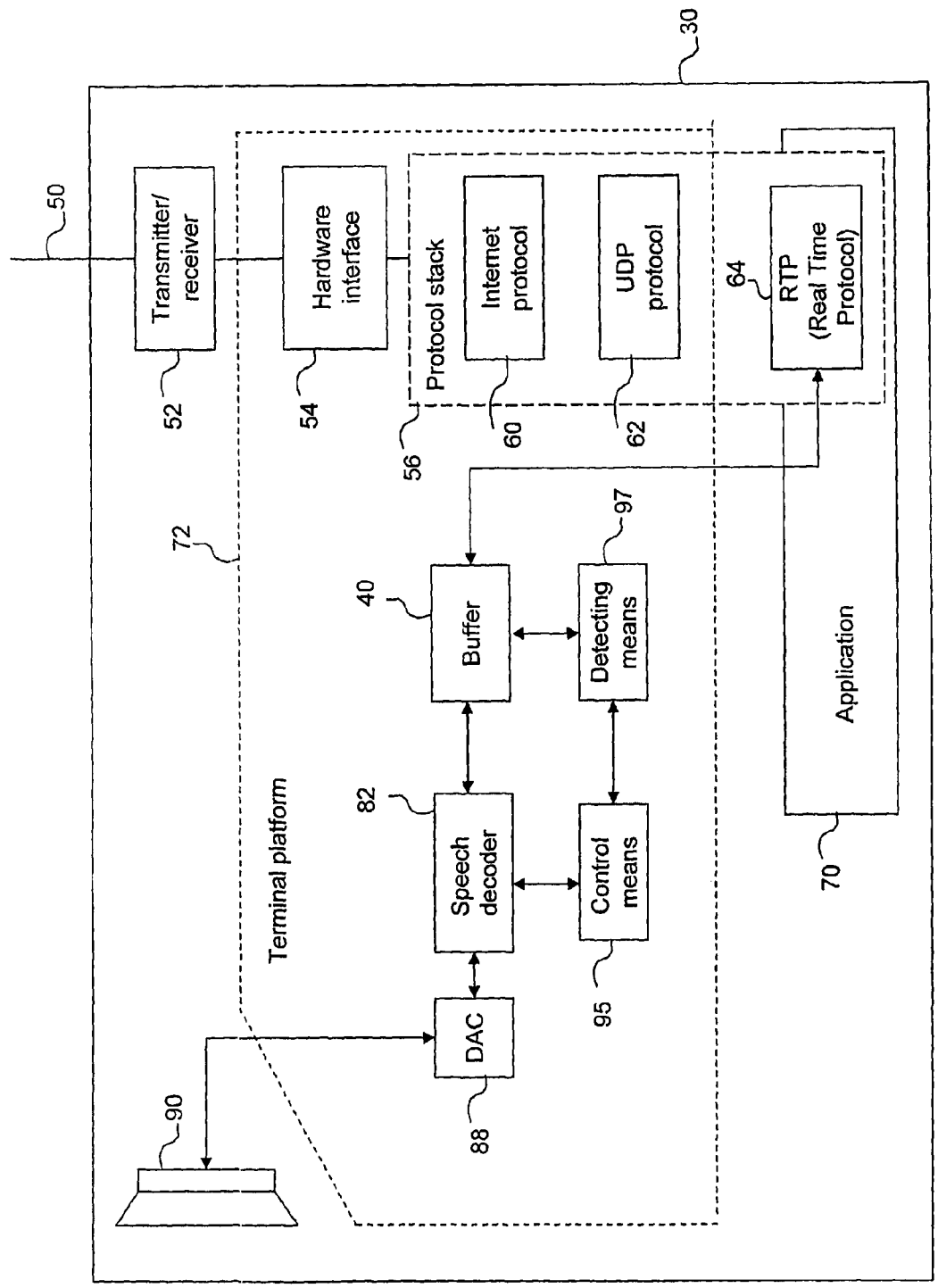
FIG. 4 is a schematic view of example constituent components of a user equipment according to the present invention.

Turning now to FIG. 4, example constituent components and functionalities of a generic representative user equipment or wireless terminal 30 will be described. The generic representative wireless terminal 30 comprises an antenna 50 which connects to a transmitter/receiver 52. The transmitter/receiver 52 is connected through a hardware interface 54 to a protocol stack 56. Frames of a media stream received over the air interface 32 by transmitter/receiver 52 are processed by protocol stack 56. The protocol stack 56 generally includes internet protocol; a transport protocol; and, an application protocol. The particular example protocol stack 56 shown in FIG. 4 happens to include Internet Protocol 60; UDP Protocol 62 (as the transport protocol); and Real Time Protocol (RTP) 64 (as the application protocol). The protocol stack 56 can be constructed differently in other implementations.

UDP (User Datagram Protocol) 62 is a transport service which is provided to a software application (such as application 70) that uses an IP network for communication. The UDP transport service provides additional functionality on top of the IP network transport function. UDP transport service operates end-to-end on a data flow. The UDP protocol 62 is not involved in intermediate nodes in the IP network, only the nodes where the data flow originates and terminates.

The Real Time Protocol (RTP) 64 is performed by an application 70. The application 70, like various other functionalities of a terminal platform portion 72 of wireless terminal 30 (including protocols in protocol stack 56), is preferably executed by one or more processors which comprise wireless terminal 30. In some example implementations, application 70 and buffer 40 may be integrated into terminal platform 72. The application 70 serves, e.g., to remove RTP headers and to pass a frame and a timestamp of the frame to buffer 40. Examples of applications which perform such functions are: network audio conferencing tools; network video conferencing tools; IP telephony tools; and packet switched streaming tools.

The terminal platform portion 72 of wireless terminal 30 includes the buffer 40 which operates under control of a buffer manager, which in this embodiment of the present invention is included in control means 95, connected to speech decoder 82, the buffer 40, and the detecting means 97. The buffer 40 is preferably implemented in software (e.g., by instructions executed by one or more of the processors comprising wireless terminal 30), and uses hardware memory allocated to application 70 when running on terminal platform portion 72. Under control of the control means 97 (i.e. the buffer manager), buffer 40 stores data of the media stream in a way to smooth out interruptions in the media transfer, thereby preferably feeding speech decoder 82 with a continuous stream of data. Also, buffer 40 operating under control of buffer manager performs re-ordering of packets (if needed), and removes or discards duplicate frames by using the timestamps of the frames.

Furthermore, a detecting means 97 is connected to the control means 95 and the buffer 40. The detecting means 97 is arranged to identify or detect interruptions or delays in the transmissions in form of a media stream received by the buffer 40, for example, transmissions in form of a media stream during a VoIP service data transmission, such as PoC data transmission. Such interruptions may be caused, as discussed above, by channel switching. Moreover, delays may also be caused by handover or set-up of adding services, such as PoC VGM, when the network is, for instance, setting up new radio resources. During the delay transmitted data is buffered in the network.

The terminal platform portion 72 of wireless terminal 30 may also include a sample buffer (not shown) which may be connected between speech decoder 82 and digital to analog converter (DAC) 88. In an example implementation, sample buffer can buffer at least one hundred sixty samples of speech with 8 kHz audio bandwidth between the speech decoder 82 and digital to analog converter (DAC) 88, and may be even larger in order to hold a few extra milliseconds of speech. For VoIP, the sample buffer can be in the order of 480 samples, and for PoC the sample buffer can be over 1000 samples (160 samples=20 milliseconds). The digital to analog converter (DAC) 88 is connected to media playback device(s) 90, such as a speaker or head-set (perhaps via, e.g., an amplifier).

Figure 5:
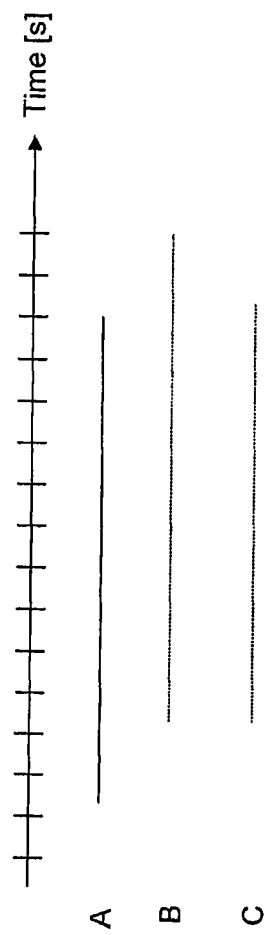
FIG. 5 is a schematic time line showing talk burst from a sending user A and the corresponding playout at a first receiver B using conventional playout and a second user C using a non-normative playout according to the present invention.

According to the present invention, the control means 95 is arranged to, upon receiving a signal from the detecting means 97 that an interruption in the transmissions has been detected, e.g. caused by a channel switch, modify the normative playout rate of the data at playout by controlling the buffer 40, the speech decoder 82, and the DAC 88. That is, the control means is arranged to change the playout speed of the media according to the condition of the channel and the current client buffer fullness. Using this non-normative or modified playout, a more efficient interactivity in the user communication can be obtained. This will now be illustrated in FIG. 5. This example makes us of a PoC service but it should be noted that the principles is the same for all user interactivity like services, for example, PoC VGM and PtS (Push-to-Show) services. In case of a channel switch, the time it takes from the moment the sender releases the VoIP service button until the response arrives from the receiver is delayed between 1-4 seconds since up to four channel switches are involved. By playing the media faster at the receiver his or hers response can be sent back earlier. For example, by playing the content approximately 20% faster it would be possible to catch up 1.5 seconds within an average talk burst, which is assumed to have a duration of about seven seconds. Accordingly, the response will then arrive 1.5 seconds earlier. FIG. 5 shows talk burst A on a time line together with the corresponding playout at two different receivers, B and C, where C is using the non-normative or modified playout according to the present invention and B is using a constant rate playout scheme in accordance with the conventional technique. As shown in FIG. 5, the start of the playout is the same for both B and C since the same amount of data is buffered. The playout ends earlier for C than for B since C uses a non-normative playout and plays the received speech faster. A response can be sent back earlier from C and in the ideal case the response can be sent at the same time as it would without any initial buffering. According to an alternative embodiment, the playout rate is modified in an adaptive way. For example, in a PoC session where a first user normally has long talk burst, the playout rate can be decreased from 20% faster than the normative playout rate during 7 seconds to 10% faster during 14 seconds. Thus, it would be possible to catch up 1.5 seconds also within a long talk burst, but with less audible distortion due to lower playout rate.

In a preferred embodiment of the present invention, an algorithm that performs a time stretching while preserving the pitch of the voice is used. It is important that pitch of the voice is kept intact while the tempo of the signal is changed, otherwise the timbre of the voice will be different. For example, the Waveform Similarity Overlap Add (WSOLA) algorithm is such an algorithm that can be used in the present invention.

In operation, the user equipment or the wireless terminal 30 according to the present invention functions as follows. The buffer 40 receives, during a VoIP service data transmission, transmissions in form of a media stream from a second user equipment and buffers the data of the media stream. As mentioned above, the detecting means 97 is arranged to detect whether an interruption has occurred during VoIP service data transmission, for example, caused by a channel switch during a PoC data transmission. The control means 95 arranged to, if a channel switch is detected, using the non-normative playout rate of the data at playout. In a preferred embodiment of the present invention, the detecting means 97 is arranged to monitor or detect whether a channel switch has occurred during the VoIP service data transmission and an interruption of the transmissions having a length within a predetermined range is interpreted or established as a channel switch. In a preferred embodiment, this range is between 0.5-2.0 seconds.

The control means 95 is further arranged to delay the playout of data comprising the media stream an estimated delay period, which, in one embodiment is the length of the interruption.

Then, the content is played out applying a playout rate being higher than the normative playout rate, using an adaptive algorithm, such as, the Waveform Similarity Overlap Add (WSOLA) algorithm.

The faster playout is applied on a first part of the content. In this example, this first part is seven seconds, which corresponds the length of an average talk burst. If the talk burst is longer than seven seconds, the remaining part of the talk burst is played out at the initial or normative playout rate. Preferably, a successive adjustment of the playout rate from the faster playout rate to the normative playout rate is performed, thereby a soft transition between the faster rate and the normative rate can be obtained which a user does not perceive as annoying.

Figure 6:
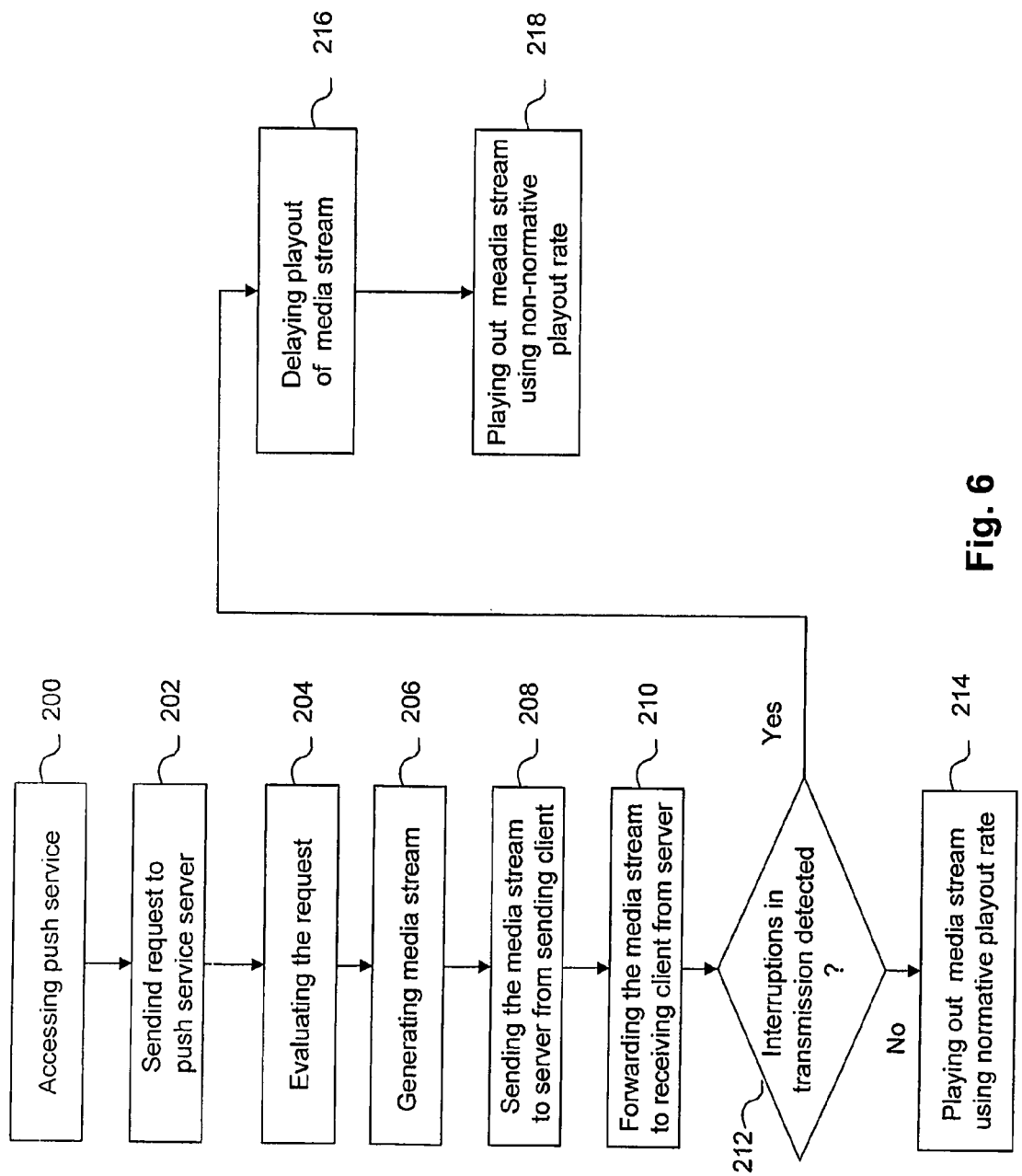
FIG. 6 is a schematic diagram showing the steps performed during a PoC service data transmission according to an embodiment of the method according to the present invention.
Figure 7:
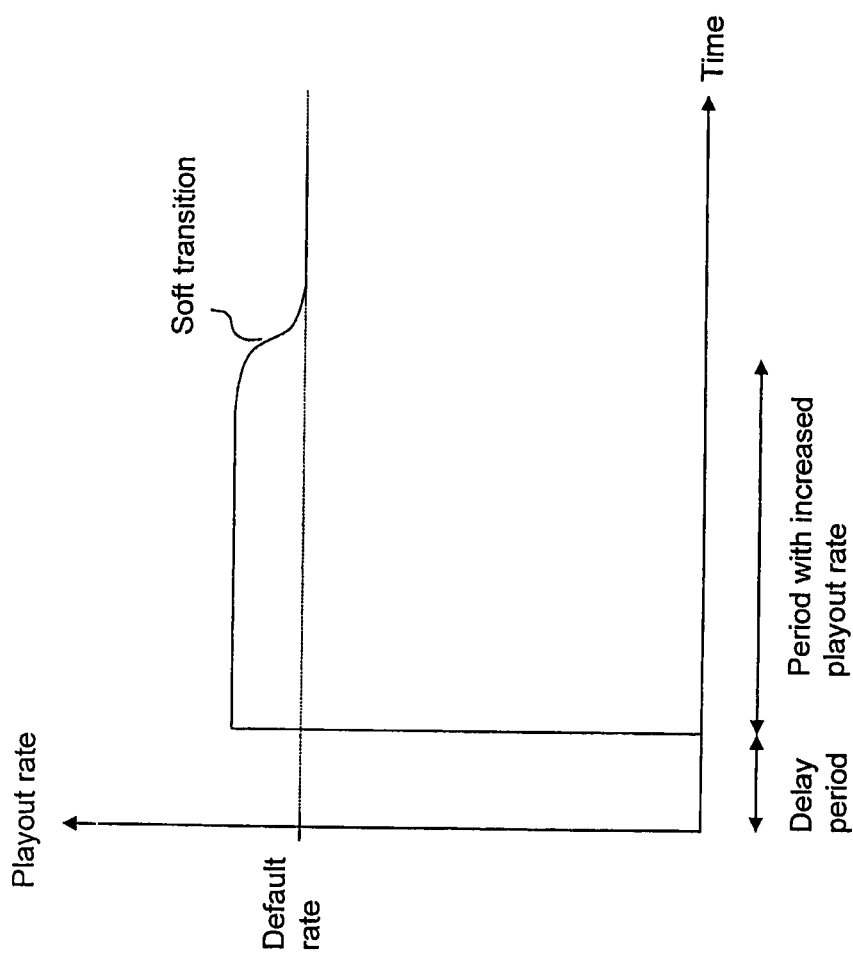
FIG. 7 is a schematic diagram showing the playout rate at a receiver using the non-normative playout according to the present invention.
Figure 8:
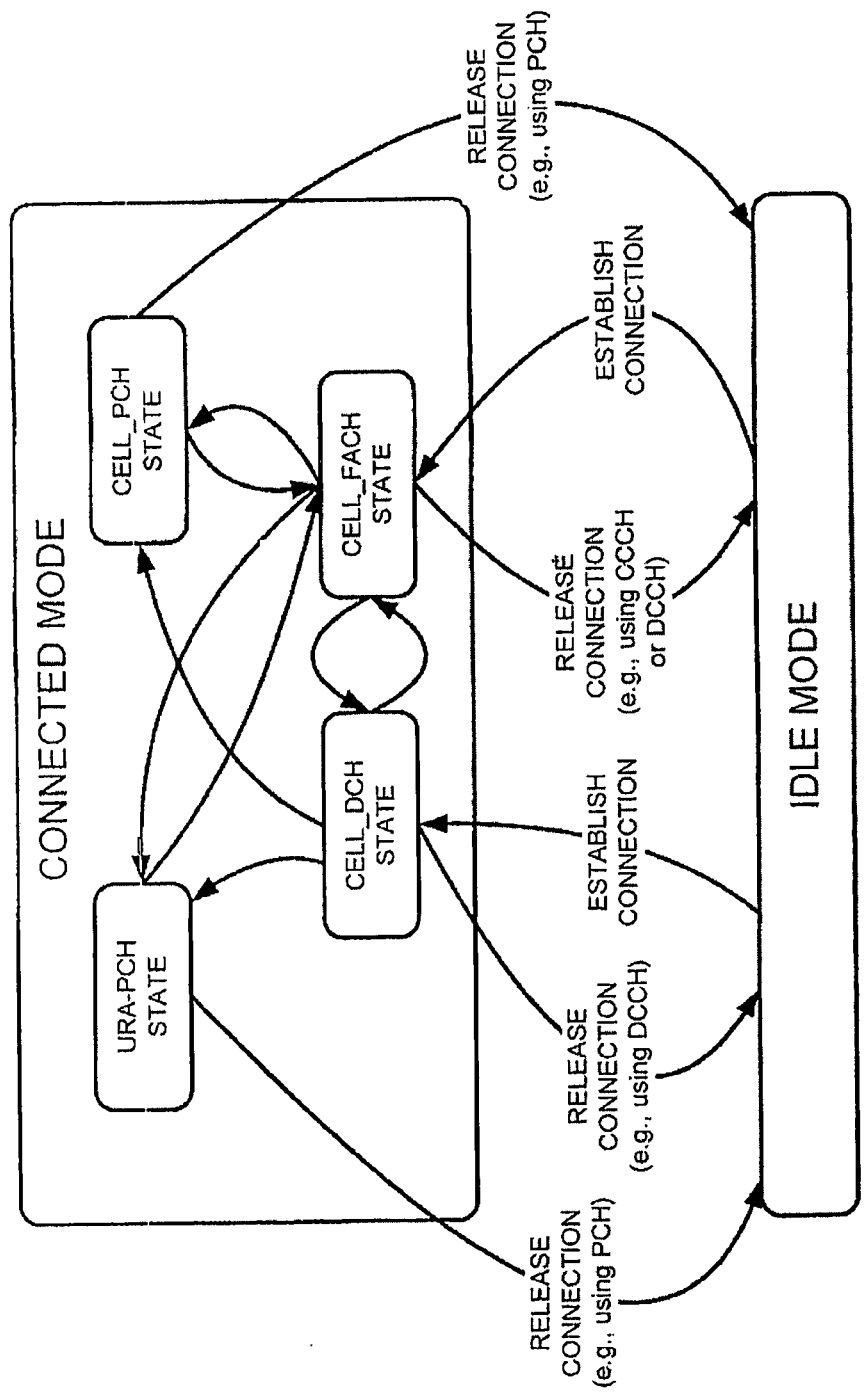
FIG. 8 is a diagrammatic view showing various modes and radio resource states of a user equipment.

Turning now to FIG. 6 and FIG. 7, an embodiment of the method for operating a user equipment arranged to communicate with at least a second user equipment in a wireless communication system using a VoIP service, provided by an application server, according to the present invention will be described. The steps involved in communication between users of user equipments using a VoIP service, such as a PoC service or a PoC VGM service according to the present invention will be described. In this example, for the sake of simplicity, only two users are discussed but the skilled man in the art realizes that the services can be used for communication between one user and an arbitrary number of users. User A wishes to send a message to user B. First, at step 200, user A accesses the desired VoIP service, for example, by pressing a VoIP service button on his user equipment or VoIP service client, for example, a mobile phone. Then, at step 202, the VoIP service client sends a request to the application server 18, see FIG. 1, asking for permission to generate data to be sent; permission to speak if using a PoC service. Subsequently, at step 204, the application server decides if it should grant or reject the request and sends either an accept or reject signal back to client A. Upon receiving the accept signal, at step 206, client A is arranged to indicate for User A that he or she is allowed to generate the signals to be sent, for example, to speak if a PoC service is used. The indication may, for example, be a visual or audible signal. The speech signal, if a PoC service is used, is encoded and ordered in packets before transmission. Thereafter, at step 208, the packets, from client A, are transmitted over the air interface to the base station and further on to the application server. The application server forwards, at step 210, the packets to client B over an air interface. Then, at step 212, client B receives the packets and, if client B detects or expects an interruption during this VoIP service data transmission, it would continue to step 216 otherwise it would continue to step 214. In a preferred embodiment of the present invention, an interruption exceeding a predetermined period of time is judged to be a channel switching. If no interruption or only an interruption shorter than the predetermined period of time is detected or expected in step 212, the process continues to step 214 where the decoder processing of the received speech frames of the received packets starts and the decoded speech frames are played out to User B by the loudspeaker in client B using a normative playout rate. On the other hand, if a channel switch was detected or expected at step 212, the process continues to step 216, where the playout of the content is delayed a predetermined delay period, see FIG. 7, which is set to the detected or expected interruption in incoming media stream. Thereafter, at step 218, the decoder processing of the received speech frames of the received packets starts and the decoded speech frames are played out to User B by the loudspeaker in client B using a playout rate, preferably, a playout rate being higher than the normative playout rate utilizing an adaptive algorithm, such as, the Waveform Similarity Overlap Add (WSOLA) algorithm. The increased playout rate is used for the playout of the content at most until the receiving media buffer is filled to the same level as if no interruption occurred. Then, a soft transition between the increased rate and the normative or default rate is performed, see FIG. 7. By using this soft transition audible artifacts can be avoided. According to an alternative embodiment, expectation of an interruption in the current receiving media stream is based on an estimate of the time that needs to pass between two consecutive received media streams (e.g. talk bursts) in order for a channel down switch (CELL_DCH to CELL_FACH), to occur. As the channel up switch initiated by the current receiving media (CELL_FACH to CELL_DCH) will cause an interruption in the media stream. In yet another alternative embodiment, the expectation of an interruption in the current receiving media stream is based on lower layer indications that a channel up switch will occur for the current receiving media stream causing an interruption in the reception of the current media stream (e.g. talk burst). The lower layer indication may be the current RRC state. Hence, if the indication is that the RRC state is CELL_FACH the receiving client can assume that a channel up switch will occur and cause an interruption in the current received media stream.

Although specific embodiments have been shown and described herein for purposes of illustration and exemplification, it is understood by those of ordinary skill in the art that the specific embodiments shown and described may be substituted for a wide variety of alternative and/or equivalent implementations without departing from the scope of the invention. Those of ordinary skill in the art will readily appreciate that the present invention could be implemented in a wide variety of embodiments, including hardware and software implementations, or combinations thereof. As an example, many of the functions described above may be obtained and carried out by suitable software comprised in a micro-chip or the like data carrier. This application is intended to cover any adaptations or variations of the preferred embodiments discussed herein. Consequently, the present invention is defined by the wording of the appended claims and equivalents thereof and the invention is not to be regarded as limited to only the structural or functional element described in the embodiments, but to the attached claims.

The invention claimed is:

1. A method for operating a first user equipment device arranged to communicate with at least a second user equipment device in a VoIP service data transmission, the method comprising:
   receiving a data stream from at least the second user equipment device, the data stream being included in the VoIP service data transmission, the data stream being associated with a normative playout rate;
   buffering at least a portion of the data stream into memory on the first user equipment device;
   determining an interruption in the VoIP service data transmission with the second user equipment device, the determined interruption having at least a minimum length;
   estimating a time period of the interruption;
   setting a delay period to the estimated time period when the interruption is determined to be a channel switch;
   outputting the buffered data at a non-normative playout rate from the first user equipment device based on the determined interruption, thereby obtaining a more efficient interactivity in VoIP communications between the first user equipment device and the second user equipment device; and
   delaying the playout of data based on the delay period,
   wherein the non-normative playout rate is greater than the normative playout rate.

2. The method according to claim 1, wherein the minimum length is based on a time period of at least one channel switch.

3. The method according to claim 1, wherein the minimum length is determined based on estimating a time period between two consecutively received data streams such that an interruption is to occur in the reception of the second of the two consecutively received data streams.

4. The method according to claim 3, wherein the time period is based on a channel down switch occurring.

5. The method according to claim 1, further comprising assuming that the interruption in the reception of the data stream will occur.

6. The method according to claim 1, further comprising obtaining a lower layer indication that an interruption in the reception of the data stream will occur.

7. The method according to claim 6, wherein the lower layer indication a current RRC state.

8. The method according to claim 1, further comprising estimating the non-normative playout rate based on measurements of a length of at least one previous talk burst and a length of the interruption.

9. The method according to claim 1, further comprising:
   modifying a playout rate to be the non-normative playout rate if the determined interruption is after playout of data at a normative playout rate.

10. The method according to claim 9, wherein the modifying further comprises:
    applying the non-normative playout rate, said non-normative playout rate being higher than said normative playout rate, at playout of said data.

11. The method according to claim 10, further comprising:
    applying said non-normative playout rate to a first part of said data; and
    applying said normative playout rate to a second part of said data.

12. The method according to claim 11, further comprising:
    controlling the playout of said first part such that it is effected during a predetermined period of time.

13. The method according to claim 1, wherein the VoIP service data transmission uses a VoIP service that is provided by an application server.

14. The method according to claim 1, wherein the VoIP service data transmission is part of a VoIP service that is a Push-to-talk Over Cellular (PoC) service, provided by a PoC server.

15. The method according to claim 1, further comprising:
    determining the non-normative playout rate based at least in part on a Waveform Similarity Overlap Add algorithm.

16. The method according to claim 10, further comprising:
performing a successive adjustment of the playout rate from said non-normative playout rate to said normative playout rate to obtain a soft transition between said non-normative rate and said normative rate.

17. The method according to claim 1, wherein the communication system is a wireless communication system.

18. A user equipment (UE) device configured to communicate with at least one other UE device in a VoIP service data transmission in a communication system using a VoIP service, the UE device comprising:
a buffer configured to receive at least a portion of a data stream of the VoIP service data transmission from the at least one other UE device, the buffer being configured to store the data stream, the data stream associated with a normative playout rate; and
at least one processing system that communicates with the buffer and is configured to:
determine an interruption in the VoIP service data transmission with the at least one other UE device, where the interruption is of at least a predetermined length;
estimate a period of time for said interruption of said transmissions;
set a delay period to the estimated period of time of the interruption;
playout data from the buffer at a non-normative playout rate that is based on the detected interruption, to thereby obtain a more efficient interactivity in user VoIP communication between the UE device and the at least one other UE device; and
delay the playout of data from the buffer by the delay period,
wherein the non-normative playout rate is greater than the normative playout rate.

19. The UE device of claim 18, wherein the predetermined length is within a predetermined range of a length of at least one channel switch.

20. The UE device of claim 18, wherein the determined interruption is further based on an estimate of a time period between two consecutively received data streams in order for the interruption to be associated with the reception of the later received data stream of the two consecutively received data streams.

21. The UE device of claim 20, wherein the time period is based on a time for a channel down switch to occur.

22. The UE device of claim 18, wherein the determined interruption is further based on assuming that the interruption in the reception of the data stream will occur.

23. The UE device of claim 18, wherein the at least one processing system is further configured to obtain a lower layer indication that the interruption will occur in the data stream.

24. The UE device of claim 23, wherein the lower layer indication is a current RRC state.

25. The UE device of claim 18, wherein the at least one processing system is further configured to estimate the non-normative playout rate based on measurements of a length of a previous talk bursts and a length of the interruption.

26. The UE device of claim 18, wherein the at least one processing system is further configured to:
playout data from the buffer at the normative playout rate;
adjust playout of the data from the buffer from the normative playout rate to the non-normative playout rate when the interruption is detected after playout and the normative playout rate has been initiated.

27. The UE device of claim 18, wherein the non-normative playout rate is higher than the normative playout rate.

28. The UE device of claim 27, wherein the at least one processing system is further configured to:
apply said non-normative playout rate at playout to a first part of data from the buffer; and
apply said normative playout rate at playout of a second part of said data from the buffer.

29. The UE device of claim 28, wherein the at least one processing system is further configured to control playout of the first part at the non-normative playout rate such that it is effected during a predetermined period of time.

30. The UE device of claim 18, wherein said VoIP service is provided by an application server.

31. The UE device of claim 18, wherein said VoIP service is a Push-to-talk Over Cellular (PoC) service, provided by a PoC server.

32. The UE device of claim 18, wherein the at least one processing system is further configured to determine the non-normative playout rate based at least in part on a Waveform Similarity Overlap Add algorithm.

33. The UE device of claim 27, wherein the at least one processing system is further configured to transition between the non-normative playout rate to the normative playout rate by successive adjustments.

34. The UE device of claim 18, wherein the communication system is a wireless communication system.

35. A non-transitory computer readable storage medium storing instructions for performing a VoIP operating method for use on a user equipment (UE) device including at least one processor, an audio output, and a memory, the stored instructions comprising instructions, which when executed by the processor, cause the UE to:
receive a media stream as part of a VoIP transmission, the media stream associated with a normal playout rate;
buffer data from at least a portion of the media stream into the memory;
detect an interruption in the VoIP transmission that is of at least a minimum length;
estimate a period of time for the interruption of the VoIP transmission;
set a delay period to the estimated period of time of the interruption;
playout at least some of the data through the audio output at a non-normative playout rate that is based on the detected interruption; and
delay the playout of the at least some of the data through the audio output by the set delay period,
wherein the non-normative playout rate is greater than the normative playout rate.

* * * * *